US009069862B1

(12) United States Patent
Perkowitz et al.

(10) Patent No.: US 9,069,862 B1
(45) Date of Patent: Jun. 30, 2015

(54) OBJECT-BASED RELATIONSHIP SEARCH USING A PLURALITY OF SUB-QUERIES

(75) Inventors: Michael Perkowitz, Seattle, WA (US); Andrew Francis Hickl, Seattle, WA (US); Kevin F. Eustice, Seattle, WA (US); Michael Zimmerman, Sammamish, WA (US)

(73) Assignee: ARO, Inc., Seattle, WA (US)

( * ) Notice: Subject to any disclaimer, the term of this patent is extended or adjusted under 35 U.S.C. 154(b) by 224 days.

(21) Appl. No.: 12/905,000

(22) Filed: Oct. 14, 2010

(51) Int. Cl.
*G06F 7/00* (2006.01)
*G06F 17/30* (2006.01)

(52) U.S. Cl.
CPC .............................. *G06F 17/30867* (2013.01)

(58) Field of Classification Search
USPC ........... 707/705, 722, 736, 769; 715/200, 273
See application file for complete search history.

(56) References Cited

U.S. PATENT DOCUMENTS

| | | | |
|---|---|---|---|
| 5,345,551 A | 9/1994 | Shelley et al. | |
| 6,366,922 B1 | 4/2002 | Althoff | |
| 6,370,554 B1 | 4/2002 | Sun-Woo | |
| 6,816,863 B2 | 11/2004 | Bates et al. | |
| 6,985,926 B1 | 1/2006 | Ferlauto et al. | |
| 7,249,123 B2 | 7/2007 | Elder et al. | |
| 7,428,579 B2 | 9/2008 | Libbey et al. | |
| 7,565,403 B2 | 7/2009 | Horvitz et al. | |
| 7,634,528 B2 | 12/2009 | Horvitz et al. | |
| 7,693,827 B2 | 4/2010 | Zamir et al. | |
| 7,885,948 B2 | 2/2011 | Johnson et al. | |
| 7,890,596 B2 | 2/2011 | Guy | |
| 8,200,676 B2 | 6/2012 | Frank | |
| 2003/0193481 A1 | 10/2003 | Sokolsky | |
| 2005/0057584 A1 | 3/2005 | Gruen et al. | |
| 2005/0261011 A1 | 11/2005 | Scott | |
| 2005/0267944 A1 | 12/2005 | Little | |
| 2006/0112146 A1 | 5/2006 | Song et al. | |
| 2006/0149710 A1 | 7/2006 | Koningstein et al. | |
| 2006/0173957 A1 | 8/2006 | Robinson et al. | |
| 2006/0195533 A1 | 8/2006 | Isozaki et al. | |
| 2006/0235873 A1 | 10/2006 | Thomas | |
| 2006/0294134 A1 | 12/2006 | Berkhim et al. | |
| 2007/0005654 A1 | 1/2007 | Schachar et al. | |
| 2007/0011236 A1 | 1/2007 | Ravula | |
| 2007/0067272 A1* | 3/2007 | Flynt et al. ........................ 707/3 |
| 2007/0214180 A1 | 9/2007 | Crawford | |
| 2007/0271272 A1 | 11/2007 | McGuire et al. | |
| 2008/0005249 A1 | 1/2008 | Hart | |

(Continued)

OTHER PUBLICATIONS

Information Technology Services, College of Architecture, Texas A&M University, "How to Schedule Rooms in Microsoft Entourage," 2009 [Online] [Retrieved Jul. 29, 2010] Retrieved from the Internet ,<URL: http://its.arch.tamu.edu/content/support/documentation/mail/entourage/entourage-room-scheduling>.

(Continued)

*Primary Examiner* — Hosain Alam
*Assistant Examiner* — Jieying Tang
(74) *Attorney, Agent, or Firm* — Fenwick & West LLP (57) ABSTRACT

A user query including one or more references to objects of various types and/or text keywords is received from a user and processed into sub-queries. Information sources execute the sub-queries and returns search results matching text keywords and/or relating to objects referenced in the user queries. The search results are organized based on their object types and relationships, and displayed in a manner exposing their relationships to the user.

21 Claims, 7 Drawing Sheets

(56) References Cited

U.S. PATENT DOCUMENTS

| | | | |
|---|---|---|---|
| 2008/0059576 | A1 | 3/2008 | Liu et al. |
| 2008/0109751 | A1 | 5/2008 | Fitzmaurice et al. |
| 2008/0228947 | A1 | 9/2008 | Markus et al. |
| 2009/0006994 | A1 | 1/2009 | Forstall et al. |
| 2009/0055355 | A1 | 2/2009 | Brunner et al. |
| 2009/0077056 | A1* | 3/2009 | Ravikumar et al. ............ 707/5 |
| 2009/0094021 | A1 | 4/2009 | Marvit et al. |
| 2009/0099901 | A1 | 4/2009 | Sah et al. |
| 2009/0171937 | A1 | 7/2009 | Chen et al. |
| 2009/0187537 | A1 | 7/2009 | Yachin et al. |
| 2009/0327271 | A1* | 12/2009 | Amitay et al. ............ 707/5 |
| 2012/0078884 | A1* | 3/2012 | Callari et al. ............ 707/722 |
| 2012/0278341 | A1 | 11/2012 | Ogilvy et al. |

OTHER PUBLICATIONS

Microsoft Corporation, "Work with Time Zones in Outlook," 2010 [Online] [Retrieved on Jul. 29, 2010] Retrieved from the Internet , <URL:http://office.microsoft.com/en-us/outlook-help/work-with-time-zones-in-outlook-HA001056530.aspx.>.

PCT International Search Report and Written Opinion, PCT Application No. PCT/US2010/020134, May 19, 2010, 7 pages.

PCT International Search Report and Written Opinion, PCT Application No. PCT/US2009/052313, Sep. 3, 2009, 7 pages.

PCT International Search Report and Written Opinion, PCT Application No. PCT/US2009/052311, Sep. 15, 2009, 6 pages.

United States Patent and Trademark Office, Final Rejection, U.S. Appl. No. 12/512,752, Sep. 13, 2012, 51 pages.

United States Patent and Trademark Office, Non-Final Rejection, U.S. Appl. No. 12/904,957, Nov. 8, 2012, 13 pages.

Hirsch, J.E., "An index to quantify an individual's scientific research output," *Proceedings of the National Academy of Sciences of the USA*, Nov. 15, 2005, pp. 16569-16572, vol. 102, No. 46.

Lehmann, S. et al., "A quantitative analysis of indicators of scientific performance," *Scientometrics*, 2008, pp. 369-390, vol. 76, No. 2.

Rijnsoever, F. et al., "A resource-based view on the interactions of university researches," *Research Policy*, 2008, pp. 1255-1266.

United States Office Action, U.S. Appl. No. 12/512,752, Aug. 30, 2013, fifty-four pages.

Aleman-Meza, B. et al., "Semantic Analytics on Social Networks: Experiences in Addressing the Problem of Conflict of Interest Detection," *Proceedings of the 15th International Conference on World Wide Web*, 2006, pp. 407-416, Edinburgh, Scotland.

Boyd, D., "Faceted ID/Entity: Managing representation in a digital world," Sep. 2002, Master of Science Thesis for Master of Science in Media Arts and Sciences at Massachusetts Institute of Technology, USA, one hundred eighteen pages.

United States Office Action, U.S. Appl. No. 12/512,752, Apr. 28, 2014, fifty-five pages.

Viegas, F. et al., "Digital Artifacts for Remembering and Storytelling: PostHistory and Social Network Fragments," Proceedings of the 37th Hawaii International Conference on System Sciences, Dec. 5-8, 2004, Hawaii, USA, ten pages.

\* cited by examiner

OBJECT-BASED RELATIONSHIP SEARCH USING A PLURALITY OF SUB-QUERIES

CROSS-REFERENCE TO RELATED APPLICATION

This application is related to U.S. patent application Ser. No. 12/512,752, filed Jul. 30, 2009, entitled "Social Network Model For Semantic Processing", which is incorporated by reference in its entirety.

BACKGROUND

1. Field of the Invention

The present disclosure generally relates to the field of information retrieval, in particular to relationship-based information retrieval and presentation.

2. Description of the Related Art

Many applications have been developed to provide keyword-based information searches. Although effective to locate documents including the keywords, keyword-based searches require that the searcher use the right keywords in order to retrieve the desired information and are likely to return too much information. In contrast, a human brain often retrieves information following a train of thought. For example, a person trying to remember the name of another person that attended a lunch meeting might remember the name of the restaurant where the meeting took place. Because the desired information (e.g., the other person's name) typically do not share keywords with the known information (e.g., the name of the restaurant), keyword-based searches cannot locate the desired information in such scenarios.

Information that a user can easily relate to typically is more helpful to the user compared to information the user cannot relate to. Applications providing keyword-based searches often provide users with only a list of matching documents, sometimes along with a small piece of content including the keywords (snippets), without identifying relationships between the returned documents and the users. Therefore, there is a need for a way to conduct searches based on relationships and to display search results in a manner that exposes the relationship between the search results and the users.

SUMMARY

Embodiments of the invention provide relationship-based searches. One aspect of the invention is a computer-implemented method of performing a relationship-based search, the method comprising: receiving a user query from a user, the user query including a reference to an object; processing the user query into a plurality of sub-queries for information related to the referenced object for a plurality of information sources; submitting the plurality of sub-queries to the plurality of information sources; receiving search results for the plurality of sub-queries from the information sources, the search results comprising an object related to the object referenced in the user query; and providing the search results for presentation to the user.

Another aspect of the invention is a computer-implemented method of displaying search results of a relationship-based search, the method comprising: receiving a plurality of search results of a user query, wherein the plurality of search results is organized into different categories and different relationships; displaying the plurality of search results in a plurality of tabbed pages, wherein search results of a same category are displayed on a same tabbed page; displaying search results of the same category in a plurality of buckets, wherein search results bearing a same (or similar) relationship to the user query are displayed in the same bucket; and responsive to a user selection of a displayed search result, providing a plurality of applicable action options to be performed against the selected search result.

One skilled in the art will readily recognize from the following discussion that alternative embodiments of the structures and methods illustrated herein may be employed without departing from the principles described herein.

DETAILED DESCRIPTION OF THE EMBODIMENTS

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Computing Environment

Figure 1:
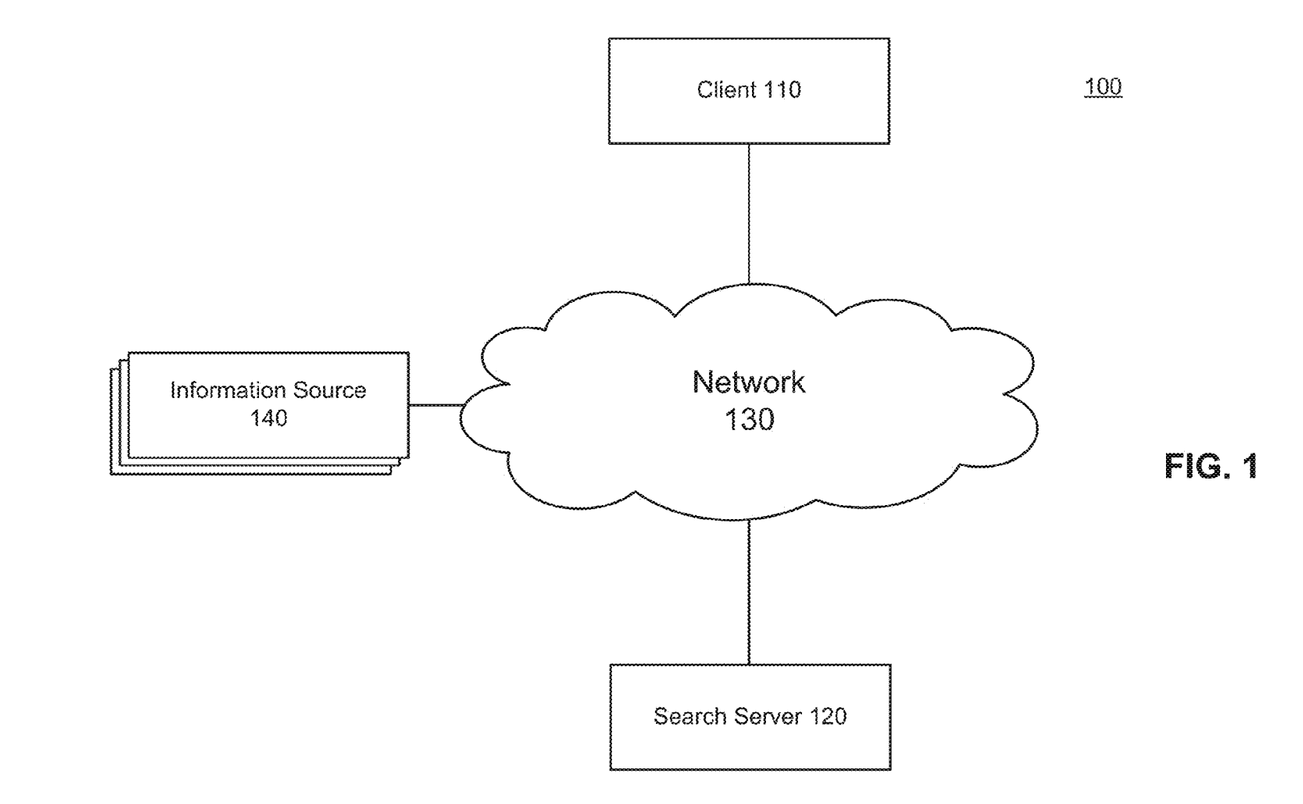
FIG. 1 is a high-level block diagram of the computing environment, in accordance with one embodiment.

FIG. 1 is a high-level block diagram of the computing environment 100 in accordance with one embodiment. As shown, the computing environment 100 includes a client 110, a search server 120, and multiple information sources 140, all connected through a network 130. Only one client 110 and one search server 120 are illustrated in order to simplify and clarify the present description. There can be other entities in the computing environment 100 as well.

The client 110 is an electronic device having network functionality. The client 110 provides a user interface for a user to access a search service provided by the search server 120. By interacting with the user interface, the user can create a user query including one or more references to objects of a variety object types (e.g., people, organizations, places, contacts, email messages, attachments to email messages, calendar entries) and/or text keywords. The client 110 sends the user query to the search server 120 and receives search results in return. The user interface presents the search results in a manner exposing their relationships to the user (also called the "searcher"). The user interface also enables the searcher to perform applicable actions to the search results (e.g., calling a person, mapping a place) or to explore further through additional searches. In one embodiment, the client 110 is a portable device, such as a personal digital assistant (PDA), and a mobile telephone.

The search server 120 provides a web-based search service accessible through the network 130. The search server 120 conducts searches based on user queries received from the clients 110. The received user queries may include text keywords and/or references to objects of a variety of object types. For each received user query, the search server 120 creates and submits a set of sub-queries to multiple information sources 140, and receives search results from the information sources 140. The search server 120 aggregates and organizes the search results based on their types and relationships, and returns the organized search results to the client 110 for presentation to the searcher.

An information source 140 is an application (or service) capable of executing a sub-query in a collection of information and returning search results. One example of an information source 140 is a social network model of the searcher. The social network model is a description of the relationships between objects found in the searcher's user data. In the social network model, relationships between two objects are represented by directional connections along with scores measuring strengths of the relationships. Another example of an information source 140 is an indexing server that performs text indexing to documents transmitted to and/or from the client 110 and the searcher's user data in other information sources 140. The indexing server may also index metadata fields of documents (e.g., fields of contact records, headers in email messages). Other examples of information sources 140 include email servers, Personal Information Management (PIM) systems, and web search servers.

The network 130 is a system of interconnected computer networks that use standard communications technologies and/or protocols to facilitate data transmission among the computer networks. Thus, the network 130 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 130 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 130 can be represented using technologies and/or formats including the hypertext markup language (HTML), the extensible markup language (XML), JavaScript, VBScript, Flash, PDF, PostScript, etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Computer Architecture

Figure 2:
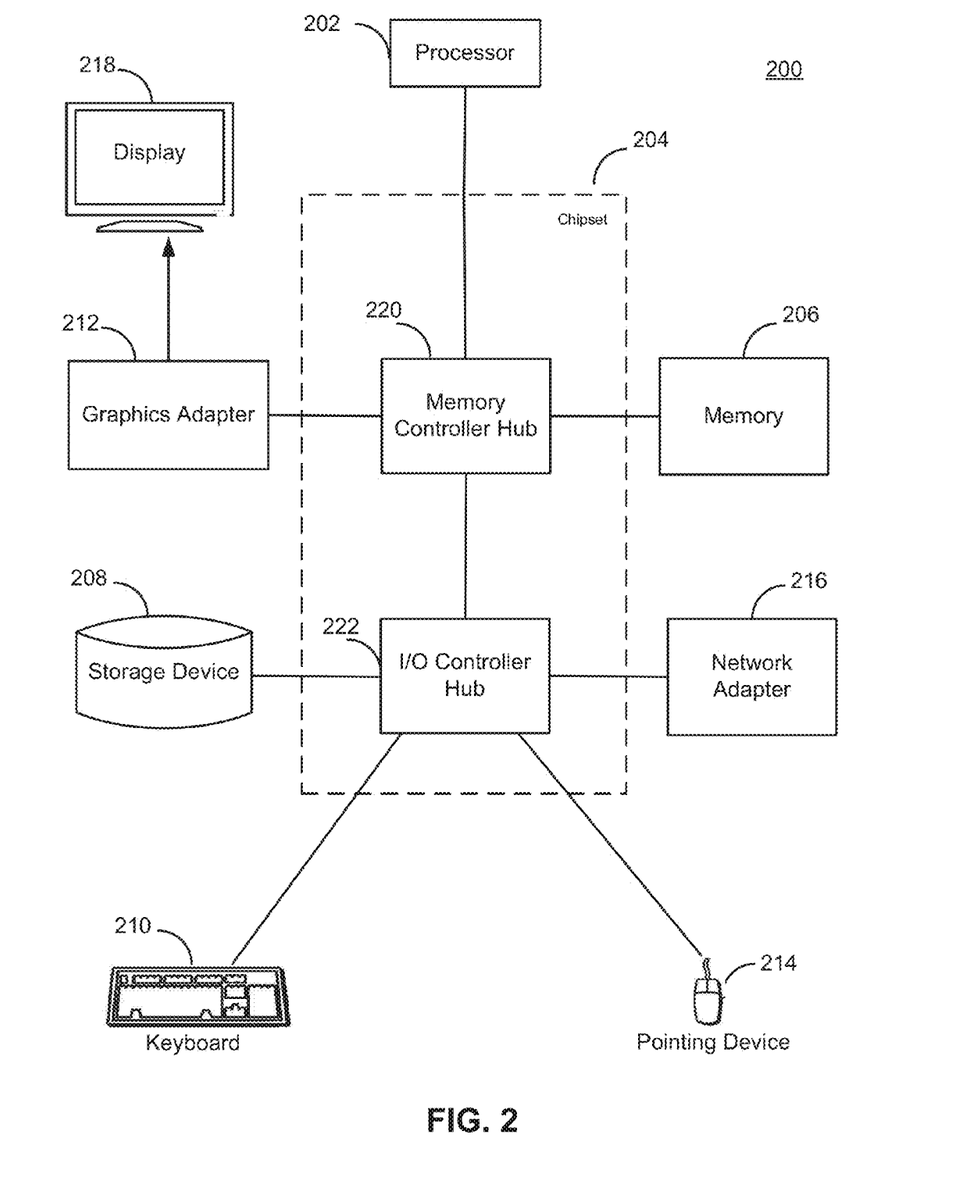
FIG. 2 is a high-level block diagram illustrating an example of a computer for use as a client or search server, in accordance with one embodiment.

The entities shown in FIG. 1 are implemented using one or more computers. FIG. 2 is a high-level block diagram illustrating an example computer 200. The computer 200 includes at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display 218 is coupled to the graphics adapter 212. A storage device 208, keyboard 210, pointing device 214, and network adapter 216 are coupled to the I/O controller hub 222. Other embodiments of the computer 200 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer 200. The graphics adapter 212 displays images and other information on the display 218. The network adapter 216 couples the computer 200 to one or more computer networks.

The computer 200 is adapted to execute computer program modules for providing functionality described herein. As used herein, the term "module" (or "engine", "model") refers to computer program logic used to provide the specified functionality. Thus, a module can be implemented in hardware, firmware, and/or software. In one embodiment, program modules are stored on the storage device 208, loaded into the memory 206, and executed by the processor 202.

The types of computers 200 used by the entities of FIG. 1 can vary depending upon the embodiment and the processing power required by the entity. For example, the search server 120 might comprise multiple blade servers working together to provide the functionality described herein. As another example, the client 110 might comprise a smartphone with limited processing power. The computers 200 can lack some of the components described above, such as keyboards 210, graphics adapters 212, and displays 218. In addition, the search server 120 can run in a single computer 200 or multiple computers 200 communicating with each other through a network such as a server farm.

Example Architectural Overview of the Search Server

Figure 3A:
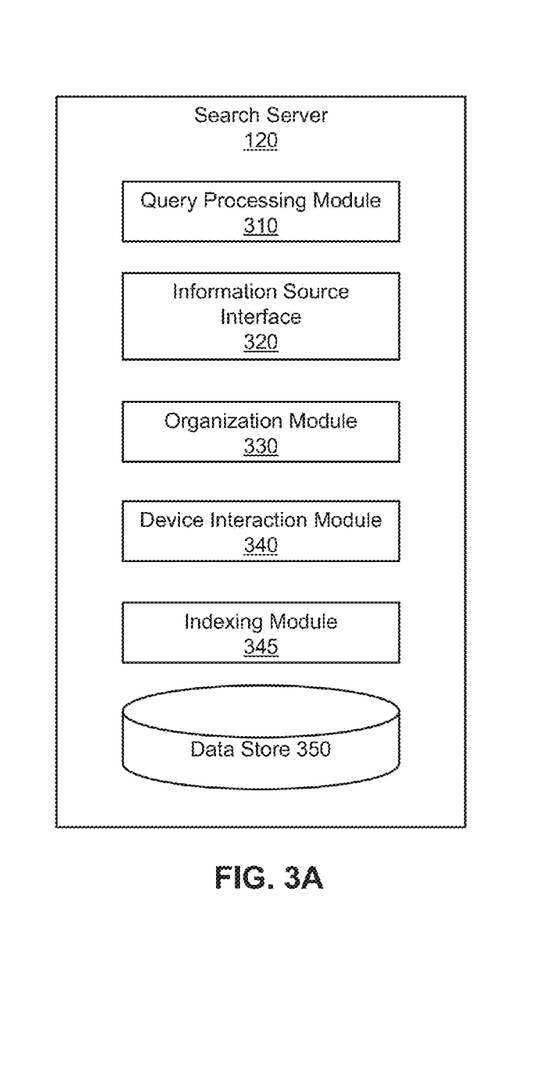
FIG. 3A is a block diagram of a search server, in accordance with one embodiment.

FIG. 3A is a block diagram of a search server 120, in accordance with one embodiment. As mentioned above, the search server 120 provides a web-based search service accessible through the network 130. As shown, the search server 120 includes a query processing module 310, an information source interface 320, an organization module 330, a device interaction module 340, an indexing module 345, and a data store 350.

The query processing module 310 processes a user query received from the client 110 into a set of sub-queries (also called "component sub-queries") targeted toward a variety of information sources 140. A user query may include one or more elements, each of which may be a reference to an object of a variety of object types or a text keyword. An object is an entity which has a distinct existence as an individual unit (e.g., a person, an organization, and a location) or a discrete collection of data, such as a file, a contact, an email message, an attachment to email message, a calendar entry, a web page, an appointment request, or any other type of electronic document. Objects are categorized into different object types, such as people types, organization types, location types, email message types, and web page types. Objects of different types are associated with different facts which support different actions. For example, a people type object representing a person is associated with an email address and supports an action of sending email message, and a business type object representing a restaurant is associated with a business address and supports actions of routing and mapping.

The user query includes parameters specifying whether an element is an object reference (and if so the type of the object) or a text keyword. A user query can be expressed in many different possible representations, such as, for example, an Extensible Markup Language (XML) data structure or a JSON data structure. The query processing module 310 inspects the parameters in the user query and creates sub-queries accordingly. In one embodiment, each object type is associated with a pre-determined set of sub-queries. For example, for a user query including a reference to a person (i.e., a people type object), the query processing module 310 launches a sub-query for objects related to that person in the searcher's social network model. As another example, for a user query that includes only text keywords, the query processing module 310 launches a sub-query for documents containing the text keywords in the indexing server. By launching sub-queries to various information sources 140 for related information, the query processing module 310 beneficially expands the original user query to retrieve related objects that may not include keywords (if any) in the user query.

The user query may include multiple object references and/or text keywords, as well as indications of how to combine the results (e.g., "AND", "OR"). For such a user query, the query processing module 310 generates one or more sub-queries for each of the multiple object references and text keywords. The search results of the sub-queries are combined according to the indications, e.g., by performing an intersection of the search results (including only search results matching each component sub-query) or a union of the search results (including all search results of all component sub-queries). To enhance performance, the query processing module 310 may combine multiple component sub-queries for information sources 140 that can process combined sub-queries more efficiently. The user query may also include parameters specifying a particular slice of search results, such as a particular category, a particular relationship, a particular starting point, and/or a particular number of search results. Only the search results satisfying the specification are returned to the client 110.

If a user query includes a reference to a document (e.g., a web page type object, an email message type object), the query processing module 310 analyzes the document to identify terms therein and creates a term vector, and then launches a sub-query for the indexing server to identify documents having similar term vectors. Additionally, the query processing module 310 can examine the metadata for the document (e.g., sender, receiver, subject, date fields for an email message, name, email address, company fields for a contact record) and launch sub-queries based on the metadata. For example, the query processing module 310 can launch a sub-query for the sender and/or receiver of an email message in the searcher's social network model.

The information source interface 320 transmits sub-queries to their targeted information sources 140 and receives search results from the information sources 140. In one embodiment, the information source interface 320 communicates with the information sources 140 using an application programming interface (API) supported by the information sources 140. New information sources 140 that handle previously unsupported object types or relationships may be added to the information source interface 320, thereby extending the scope and functionality of the search server 120. Existing information sources 140 may also extend the set of object types and/or relationships they support to extend the scope and functionality of the search server 120.

The information sources 140 execute the sub-queries and then return a set of matching/related objects. The objects may include text keywords in the sub-queries and/or be related to objects referenced in the sub-queries. For example, the searcher's social network model, in response to a sub-query for a person named "Mike Perkowitz" (i.e., a people type object), returns a list of people (i.e., people type objects) with whom Mike has a relationship, ranked by the strength of the relationships. As another example, the indexing server, in response to a sub-query for a text keyword "mike perkowitz" (i.e., a text string), returns a list of documents within which the text keyword appears, ranked by factors such as accuracies of the matches and numbers of matches.

The information source interface 320 aggregates the search results of the sub-queries from various information sources 140. The search results returned by the information sources 140 identify matching/related objects using unique object identifiers (e.g., object IDs) along with identifiers of the types of the objects (e.g., object type IDs), and identifiers of their relationships with the text keywords and/or objects referenced in the sub-queries (e.g., relationship type IDs). The search results may also include summary information describing the matching/related objects. The information source interface 320 may use the object IDs to retrieve additional summary information of the objects from the data sources and include the additional summary information in the aggregated search results. For example, if the search results for a sub-query from an email server includes an object ID uniquely identifying an email message, the information source interface 320 queries the email server to obtain summary information for that email message, such as a snippet of text from the body of the email message and the header of the email message.

The organization module 330 organizes objects in the search results into different categories based on their object types, and groups objects within a same category into buckets based on their relationships for presentation to the user. Example categories include people, messages, organizations, files, locations, events, phone calls, uniform resource locators (URLs), and web pages.

The people category includes objects representing people (e.g., people type objects and contact record type objects). These objects can be grouped into one or more of the following buckets: (1) people matching text keywords based on text match, (2) people in common email threads as the searched person (i.e., the person referenced in the user query), (3) people in common meetings with the searched person, (4) people belonging to a same organization as the searched person, (5) people sharing a same postal address as the searched person, (6) people sharing a same email address (e.g., a group email address) as the searched person, (7) people working for the searched organization (i.e., the organization referenced in the user query), and (8) people who attended meetings at the searched organization/location.

The messages category includes objects representing messages (e.g., email messages and SMS messages). These objects can be grouped into the following buckets: (1) messages matching text keywords based on text search, (2) messages sent/received by the searched person, and (3) messages mentioning the searched person (e.g., referenced in message body or subject).

The organizations category includes objects representing organizations (e.g., businesses, nongovernmental organizations). These objects can be grouped into the following buckets: (1) organizations matching text keywords based on text search, (2) organizations associated with the searched person (e.g., employer, business partners), and (3) organizations at which the searched person attended meetings.

The files category includes objects representing electronic files (e.g., word processor documents, spreadsheets). These objects can be grouped into the following buckets: (1) files with content matching text keywords based on text search, (2)

files with filenames matching the text keywords, and (3) files attached to emails/event invitations sent to or from the searched person.

The locations category includes objects representing locations. These objects can be grouped into the following buckets: (1) locations matching text keywords based on text search, (2) locations associated with searched person/organization/event, and (3) locations in which the searched person attended meetings.

The events category includes objects representing events (e.g., calendar entries). These objects can be grouped into the following buckets: (1) events matching text keywords based on text search, (2) events organized/participated in by the searched person, (3) events that occurred at the searched organization, and (4) events that occurred at the searched location.

The phone calls category includes objects representing past phone calls. These objects can be grouped into the following buckets: (1) phone calls from the searcher to the searched person, and (2) phone calls received by the searcher from the searched person.

The URLs category includes objects representing URLs. These objects can be grouped into the following buckets: (1) URLs mentioned in messages from the searched person, (2) URLs associated with the searched person (e.g., URLs appearing in the searched person's message signature)/organization, (3) URLs directly associated with the searched person (e.g., a URL in a "web page" field of a contact record), and (4) URLs appearing in the searched person's user text (e.g., URL of the searched person's personal web page).

The web pages category includes objects representing web pages matching text keywords based on text search. These objects typically are not grouped (because they tend to bear similar relationships with text keywords and no relationship with the searcher).

Additional search result categories may be included by registering new information sources 140 capable of returning search results of additional object types with the information source interface 320 (or expanding existing registered information sources 140). These information sources 140 can also define relationships for grouping search results.

In one embodiment, the organization module 330 is configured to organize search results into a predetermined set of categories and buckets. In another embodiment, the information sources 140 may provide additional information for the organization module 330 to create new categories and/or buckets to organize the search results from the information sources 140. Because the search results are organized into different categories and buckets, the organized search results can be considered to have a category dimension and a bucket dimension. The organized search results are then returned to the client 110 to be presented in a manner that exposes the relationship between the search results and the searcher.

The device interaction module 340 manages the communications between the search server 120 and the client 110. Specifically, the device interaction module 340 receives user queries from the client 110 and returns organized search results to the client 110 for presentation to the user.

The indexing module 345 creates data indexes for information sources 140 registered with the information source interface 320 to facilitate generating search results for the information sources 140. In one embodiment, the indexing module 345 creates a keyword index for all text in an information source 140 for performing keyword matches in that information source 140. The user's social network model can be used (e.g., by the information source interface 320) to find possible person matches. Some information sources 140 may include their own indexing modules internally, while other information sources 140 may require that the data indexing module 345 to create data indexes for those information sources 140.

The data store 350 stores data used by the search server 120. Examples of such data include information about the client 110 and the information sources 140 (e.g., network addresses) and social network models. The data store 350 may be a relational database or any other type of database, or an in-memory data-structure.

Example Architectural Overview of the Client

Figure 3B:
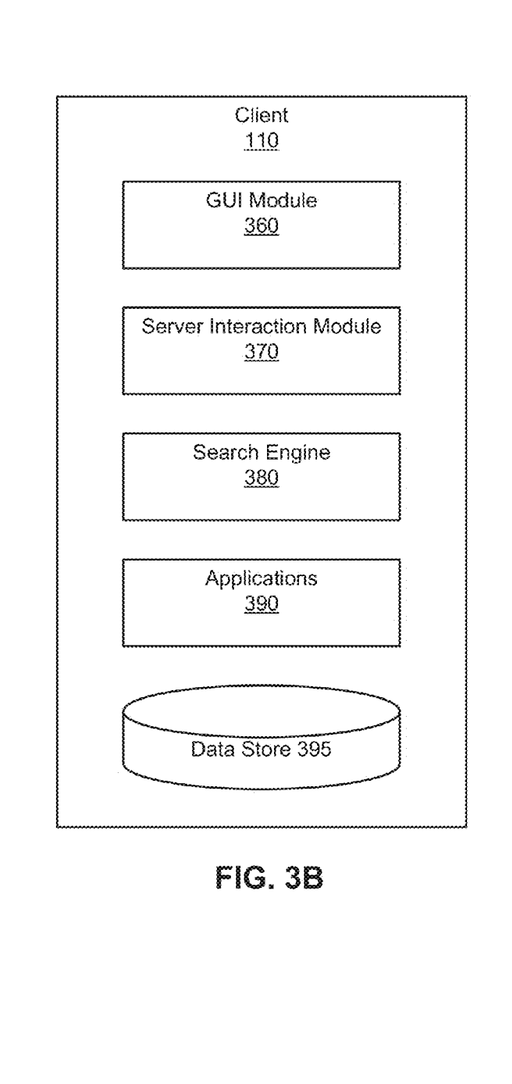
FIG. 3B is a block diagram of a client, in accordance with one embodiment.

FIG. 3B is a block diagram of a client 110, in accordance with one embodiment. As mentioned above, the client 110 provides a user interface (UI) for a user to accesses a search service provided by the search server 120. As shown, the client 110 includes a graphical user interface (GUI) module 360, a server interaction module 370, a search engine 380, applications 390, and a data store 395.

The GUI module 360 provides a graphical UI for a user to formulate user queries and review/interact with search results. In one embodiment, the GUI module 360 is developed using the Java programming language. In another embodiment, the GUI module 360 includes a webpage that can be launched and operated using a standard web browser (e.g., Google Chrome™, Microsoft Internet Explorer™, Mozilla Firefox™, or Apple Safari™).

Figure 5A:
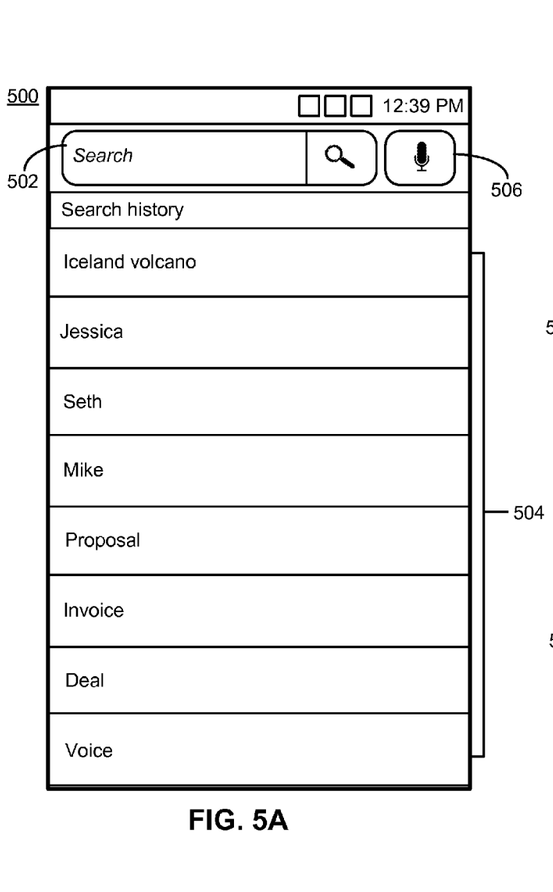
FIGS. 5A-5E are snapshots illustrating an example user interface, in accordance with one embodiment.

FIG. 5A illustrates a screenshot of an example UI 500 of the GUI module 360. As shown, the UI 500 includes a search box 502 for the user to type in user queries, and lists recent searches 504 for the user to select. Instead of (or in addition to) typing, the user can input user queries via voice command, as illustrated by the microphone button 506, or via other input mechanisms, such as an on-device camera.

Figure 5B:
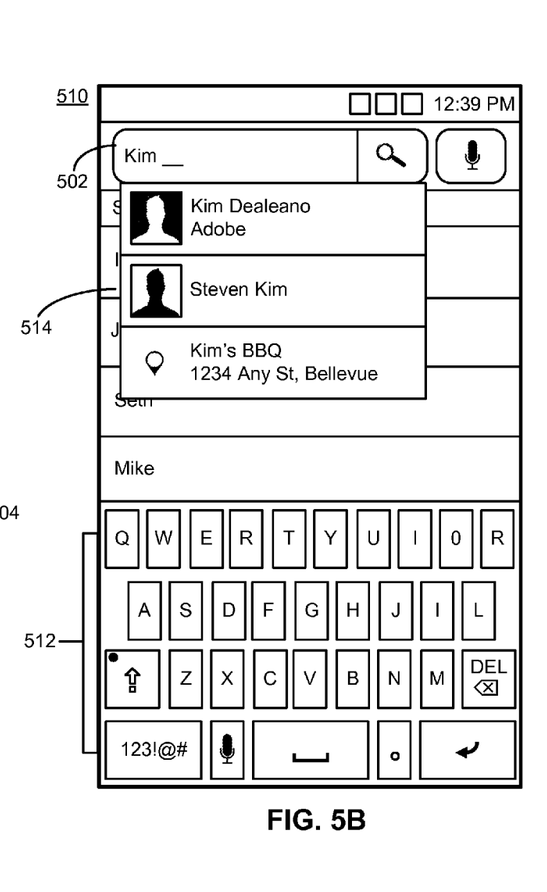

FIG. 5B illustrates a screenshot of another example UI 510 of the GUI module 360. As shown, the user can type in a user query in the search box 502 using a display keyboard 512 or an on-device physical keyboard. As the user typing in a text phrase, the GUI module 360 (or the search server 120) recognizes a list of candidate objects potentially matching the text in the query using gazetteers, and displays them in an overlay menu 514. A gazetteer is a structured collection of data for recognizing object references. Additional information about using gazetteers to recognize objects being referenced by a text phrase can be found in U.S. patent application Ser. No. 12/512,752, filed Jul. 30, 2009, entitled "Social Network Model For Semantic Processing", which is incorporated by reference in its entirety. In one embodiment, gazetteers used for matching include lists of the user's contacts and acquaintances, commonly-visited locations, and commonly-visited or related organizations. The user can select a desired object from the overlay menu 514, causing the user query to include a reference to the selected object. Alternatively, the user can ignore the overlay menu 514 and keep the text phrase as a keyword.

In one embodiment, the user can launch a user query for an object by selecting a search action against a reference of the object displayed in the GUI module 360 or against a reference of the object displayed in a document or elsewhere in a client UI outside of the GUI module 360. The GUI module 360 may also automatically create user queries based on real-time user contexts. For example, when the user views a person's contact information, the GUI module 360 may automatically launch a user query specifying that person and search for related information.

To indicate the distinction between a text keyword element and an object reference element in a user query, the GUI module 360 visually distinguishes the elements in the display.

Figure 5C:
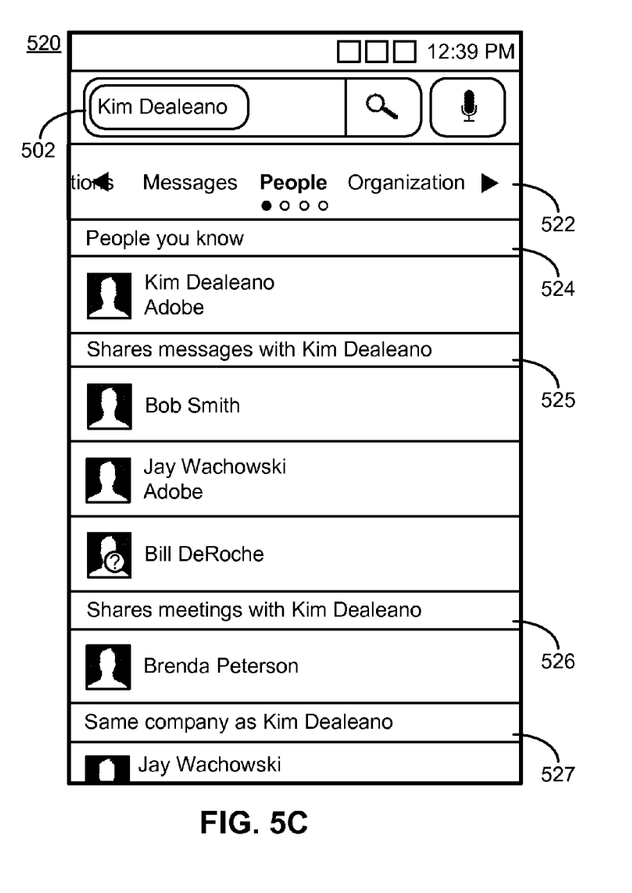

In one embodiment, the GUI module 360 draws a box around the object reference, and not the text keyword. As shown in FIG. 5C, a screenshot of an example UI 520 of the GUI module 360, the phrase "Kim Dealeano" appearing in the search box 502 is in a box, indicating that the phrase is a reference to a person named "Kim Dealeano" (a people type object), and not a text keyword. The GUI module 360 includes in the user query parameters specifying whether elements in the user query are object references or text keywords.

Figure 5D:
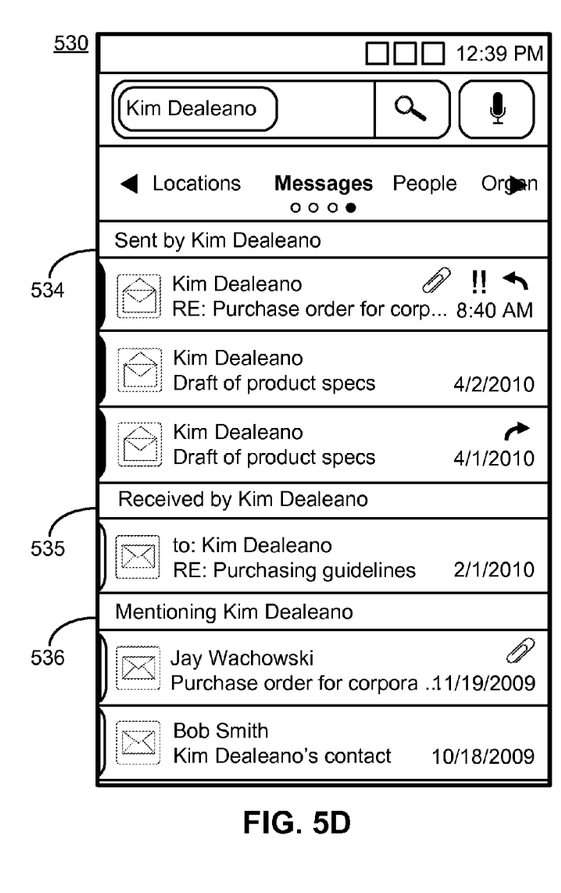
Figure 5E:
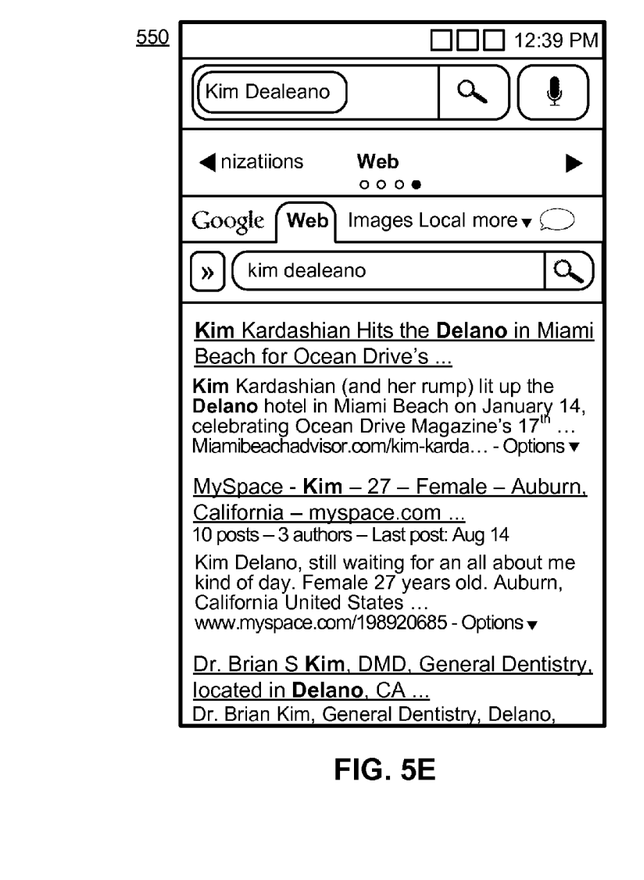

The GUI module 360 presents search results in a manner that exposes the relationships between objects in the search results and the searcher (or the object(s) referenced in the user query). In one embodiment, to fully utilize the organized search results received from the search server 120, the GUI module 360 displays the search results in a category-heading search result UI, as illustrated in FIGS. 5C-5E. As described above, the search server 120 organizes search results into categories and buckets, which inherently expose the relationships of the search results: the categories group the search results in a same way that the user would group them (by object type), and the buckets expose the relationships between the search results and the user (and/or the referenced object(s)). The GUI module 360 displays search results of each category in a tabbed page designated to that category, and displays search results within a specific bucket under a heading within the tabbed page explaining the relationships shared by such search results.

The GUI module 360 allows the user to request additional search results for any category/bucket. In one embodiment, each bucket (and/or category) has a "more" button that the searcher can select to request for additional search results (e.g., from the search server 120) for the appropriate bucket.

Referring to FIG. 5C, the UI 520 displays search results of a user query for a person named "Kim Dealeano". As shown, the UI 520 includes a dashboard 522 listing categories containing the organized search results. The category currently presented ("People") is highlighted in the dashboard 522. As shown, the people category includes matching or related people grouped into buckets according to their relationships with Kim (and/or the searcher) and displayed under headings summarizing the relationships. Four of such buckets are displayed in the UI 520: (1) a bucket 524 for people named "Kim Dealeano" that the searcher knows ("People you know"), (2) a bucket 525 for people that share email messages with Kim and the searcher ("Shares messages with Kim Dealeano"), (3) a bucket 526 for people that share meetings with Kim and the searcher ("Shares meetings with Kim Dealeano"), and (4) a bucket 527 for Kim's colleagues ("Same company as Kim Dealeano").

FIG. 5D illustrates a screenshot of an example UI 530 of the GUI module 360 displaying search results in the message category for the user query for Kim Dealeano. As shown, the message category includes messages related to Kim (and/or the searcher) and are grouped into buckets according to their relationship with Kim (and/or the searcher). Three such buckets are displayed in the UI 530: (1) a bucket 534 for messages sent by Kim, (2) a bucket 535 for messages received by Kim, and (3) a bucket 536 for messages mentioning Kim.

FIG. 5E illustrates a screenshot of an example UI 540 of the GUI module 360 displaying search results in the web page category for the user query for Kim Dealeano. As shown, the web page category includes search results returned from Google for a keyword search for "kim dealeano". Search results in the web page category are not grouped into buckets.

The category-heading search result UI illustrated in FIGS. 5C-5E encourages the searcher to explore related objects/information (e.g., via iterative searches). In addition, the GUI module 360 provides action options for the searcher to perform against objects in the search results. For example, for the following user query "meet Mike at Wild Ginger", the GUI module 360 displays search results including people that are likely referenced as "Mike" and organizations that are likely referenced as "Wild Ginger", and provides the searcher with an action option of sending an invitation to Mike for a meeting at Wild Ginger.

In one embodiment, in addition to (or instead of) sending the user query to the search server 120, the user query is executed locally on the client 110. The GUI module 360 displays the local search results in the category-heading search result UI as soon as they become available, and merges in the search results from the search server 120 as they arrive. In an alternate embodiment, local search results are displayed only if the server fails to respond within a predetermined timeout period.

Returning to FIG. 3, the server interaction module 370 manages the communications between the search server 120 and the client 110. Specifically, the server interaction module 370 transmits user queries to the search server 120 and receives organized search results back from the search server 120. In one embodiment, the server interaction module 370 calls an API of the search service provided by the search server 120 to communicate with the search server 120.

The applications 390 support various functionality of the client 110. For example, the client 110 may include telephone, email, calendar, contact manager, browser, position determination, word processing, spreadsheet, and/or other business or personal applications 390. In one embodiment, the action options the GUI module 360 provides to the searcher for performing against the search results are performed by the corresponding applications 390. In addition, one or more of the applications having access to local user data may register to the search engine 380 as local information sources, execute user queries, and provide the search engine 380 with search results. Applications 390 may also support the execution of keyword searches and search actions on objects (or object references) displayed therein. Invoking a search action from an application 390 may open the GUI module 360.

The search engine 380 executes user queries to search user data residing on the client 110 for matching/related objects, organizes the search results based on the object types and relationships, and provides the organized search results to the GUI module 360 for presentation to the user. Similar to the search server 120, the search engine 380 processes user queries into a set of sub-queries, and sends the sub-queries to local information sources (e.g., applications 390). The search engine 380 organizes the search results received from the local information sources and provides the organized search results to the GUI module 360 for presentation to the user.

The data store 395 stores data used by the client 110. Examples of such data include information about the search server 120 (e.g., network address) and local user information. The data store 395 may be a relational database or any other type of database, or an in-memory data-structure.

Example Methodology of Relationship-Based Search

Figure 4:
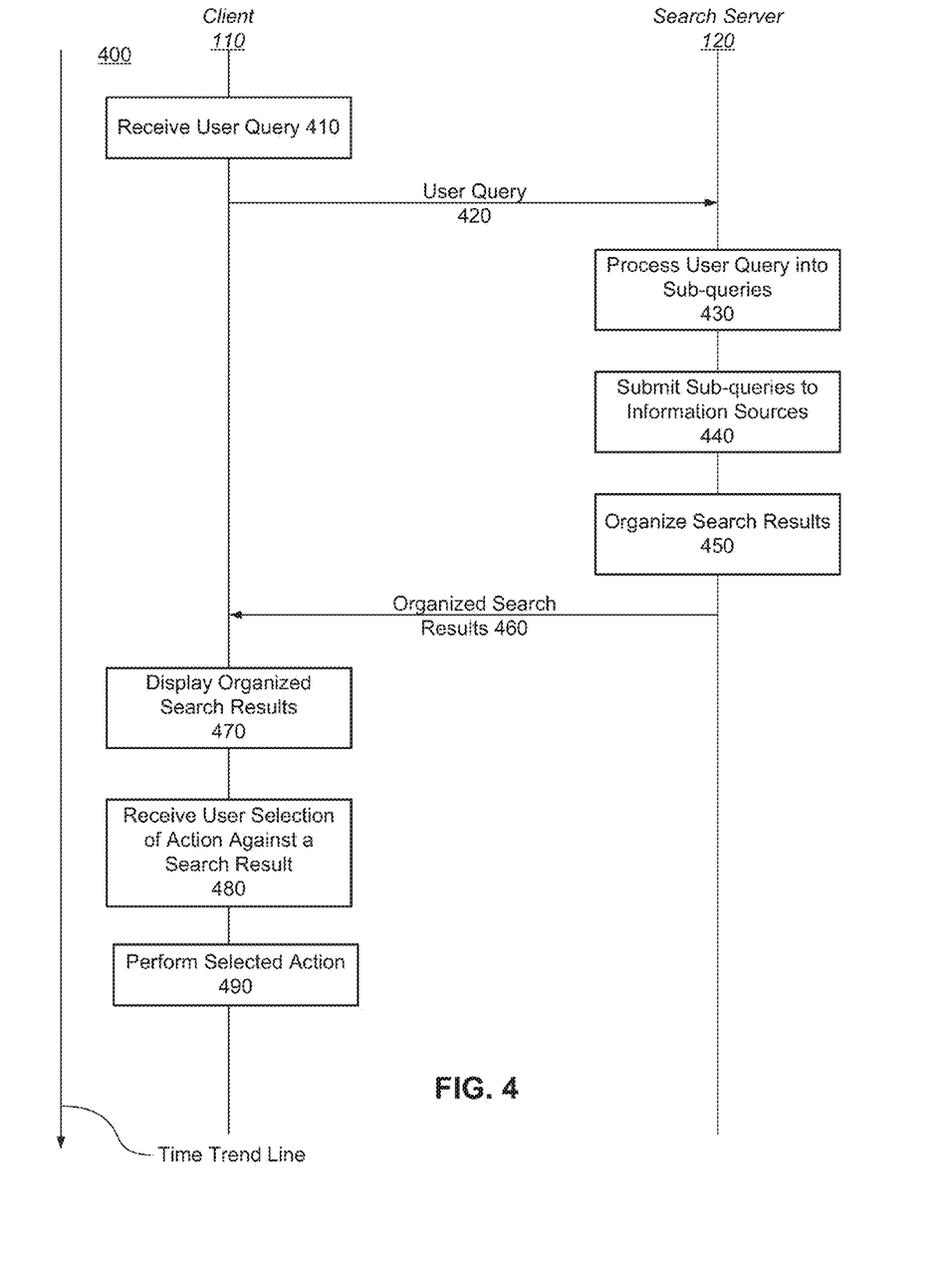
FIG. 4 is a flow chart illustrating a method of conducting a relationship-based search, in accordance with one embodiment.

FIG. 4 is a ladder diagram illustrating a process 400 of conducting a relationship-based search using the search service provided by the search server 120, in accordance with one embodiment. Other embodiments can perform the steps of the process 400 in different orders. Moreover, other embodiments can include different and/or additional steps than the ones described herein.

In step 410, a user (the searcher) inputs a user query into the client 110. The user query may include one or more elements, each of which may be a reference to an object or a text keyword. For example, the user may create a search query for a person named "Kim Dealeano" (i.e., a people type object). In step 420, the client 110 transmits the user query to the search server 120 along with parameters specifying elements in the user query (e.g., whether the element is an object reference (and if so the type of the object) or a text keyword).

In step 430, the search server 120 processes the user query into a set of sub-queries and submits them to a variety of information sources 140 in step 440. For example, a sub-query is submitted to the searcher's social network model for objects related to Kim. In step 450, the search server 120 retrieves search results from the information sources 140 and organizes the search results into categories and buckets based on their object types and relationships. For example, the search server 120 categorizes objects in the search results into the following categories: locations, messages, people, organizations, and web pages, and organizes objects in each category into different buckets based on their relationships with the searcher and/or Kim. In step 460, the search server 120 returns the organized search results to the client 110.

In step 470, the client 110 displays the received organized search result in a manner that exposes the relationship between the search results and the searcher and provides action options for the searcher to perform against the search results. For example, the client 110 displays the organized search results in a category-heading search result UI as illustrated in FIGS. 5C-5E. In step 480, the client 110 receives a user selection of an action option against a search result, and performs the selected user action in step 490. For example, the searcher may select a person known to share messages with Kim, and select an applicable action option (e.g., by choosing from an overlay menu) to call that person. The client 110 launches a phone application and initiates a call to that person in response.

ADDITIONAL EMBODIMENTS

In another embodiment, a user may input a special user query containing only the text keyword "now". In response to this special query, the client 110 generates a user query specifying a current user context (e.g., the user's identity, location, time, recent emails, current scheduled events, etc.), and displays matching/related information in a manner that exposes the relationship between the search results and the user.

The described embodiments beneficially retrieve information not only matching the user query, but also relating to the user query, and exposing the relationships in a presentation of the search results to the user. Thus the user can conveniently understand why certain information was returned as search results, and to navigate among the relationships in an intuitive manner. Thus, the described embodiments are aligned with how people naturally retrieve information and thereby provide an improved information retrieval mechanism.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for conducting relationship-based searches and presenting search results in a manner that exposes the relationship between the search results and the searcher. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

The invention claimed is:

1. A computer-implemented method of performing a relationship-based search, the method comprising:
   receiving a user query from a user, the user query including a reference to a query object;
   processing the user query into a plurality of sub-queries for information related to the query object, each sub-query being for a corresponding one of a plurality of information sources;
   submitting the plurality of sub-queries to the plurality of information sources;

receiving search results for the plurality of sub-queries from the information sources, each search result identifying (a) a search result object related to the query object and (b) a type of relationship indicating a type of relevancy of the search result to the search query;

organizing the search results into a plurality of categories based on types of objects identified in the search results, wherein each of the plurality of categories includes a respective type of objects, the plurality of categories including a first category comprising a first subset of search results with a first object type and a second category comprising a second subset of search results with a second object type;

organizing the first subset of search results in the first category into a plurality of buckets based on types of relationships indicating types of relevancy of the first subset of search results to the search query, each bucket including search results with a respective type of relationship with the search query, the plurality of buckets including a first bucket comprising a first further subset of the first subset of search results in the first category with a first type of relationship with the search query and a second bucket comprising a second further subset of the first subset of search results in the first category with a second type of relationship with the search query; and providing the search results organized into the plurality of categories, the provided search results including the first subset of search results in the first category organized into the plurality of buckets for presentation to the user.

2. The method of claim 1, wherein the processing comprises:

processing the user query into a sub-query for information related to the query object for a social network model of the user, the social network model comprising information about a plurality of objects related to the user and relationships among the plurality of objects, wherein the submitting comprises:

submitting the sub-query to the social network model, and wherein the receiving comprises:

receiving from the social network model a search result identifying an object related to the query object according to the relationships among the plurality of objects in the social network model.

3. The method of claim 1, wherein the processing comprises:

processing the user query into a sub-query for information related to the query object for an indexing server, the sub-query identifying a text keyword in the user query, and the indexing server indexing documents transmitted to or from the user, wherein the submitting comprises:

submitting the sub-query to the indexing server, and wherein the receiving comprises:

receiving from the indexing server a search result identifying a document including the text keyword.

4. The method of claim 1, wherein the types of relationships include a relevancy of the search result to the user.

5. The method of claim 1, wherein the first category includes search results that identify people type objects, the query object identifies a person, and the types of relationships include at least one of: people included in email threads with the person, people with meetings in common with the person, people belonging to a same organization as the person, and people sharing a postal address with the person.

6. The method of claim 1, wherein the first category includes search results that identify message type objects, the query object identifies a person, and the types of relationships include at least one of: messages sent by the person, messages received by the person, and messages mentioning the person.

7. The method of claim 1, wherein the first category includes search results that identify organization type objects, the query object identifies a person, and the types of relationships include at least one of: organizations associated with the person, and organizations at which the person attended a meeting.

8. The method of claim 1, wherein the first category includes search results that identify location type objects, the query object identifies a person, and the types of relationships include at least one of: locations associated with the person, and locations at which the person attended a meeting.

9. The method of claim 1, wherein the first category includes search results that identify event type objects, the query object identifies a person, and the types of relationships include at least one of: events organized by the person, and events participated in by the person, and events at which the person attended a meeting.

10. A non-transitory computer-readable storage medium storing executable computer program instructions for performing a relationship-based search, the computer program instructions comprising instructions for:

receiving a user query from a user, the user query including a reference to a query object;

processing the user query into a plurality of sub-queries for information related to the query object, each sub-query being for a corresponding one of a plurality of information sources;

submitting the plurality of sub-queries to the plurality of information sources;

receiving search results for the plurality of sub-queries from the information sources, each search result identifying (a) a search result object related to the query object and (b) a type of relationship indicating a type of relevancy of the search result to the search query;

organizing the search results into a plurality of categories based on types of objects identified in the search results, wherein each of the plurality of categories includes a respective type of objects, the plurality of categories including a first category comprising a first subset of search results with a first object type and a second category comprising a second subset of search results with a second object type;

organizing the first subset of search results in the first category into a plurality of buckets based on types of relationships indicating types of relevancy of the first subset of search results to the search query, each bucket including search results with a respective type of relationship with the search query, the plurality of buckets including a first bucket comprising a first further subset of the first subset of search results in the first category with a first type of relationship with the search query and a second bucket comprising a second further subset of the first subset of search results in the first category with a second type of relationship with the search query; and providing the search results organized into the plurality of categories, the provided search results including the first subset of search results in the first category organized into the plurality of buckets for presentation to the user.

11. The non-transitory computer-readable storage medium of claim 10, wherein the processing comprises:

processing the user query into a sub-query for information related to the query object for a social network model of the user, the social network model comprising information about a plurality of objects related to the user and relationships among the plurality of objects, wherein the submitting comprises:

submitting the sub-query to the social network model, and wherein the receiving comprises:

receiving from the social network model a search result identifying an object related to the query object according to the relationships among the plurality of objects in the social network model.

12. The non-transitory computer-readable storage medium of claim 10, wherein the processing comprises:

processing the user query into a sub-query for information related to the query object for an indexing server, the sub-query identifying a text keyword in the user query, and the indexing server indexing documents transmitted to or from the user, wherein the submitting comprises:

submitting the sub-query to the indexing server, and wherein the receiving comprises:

receiving from the indexing server a search result identifying a document including the text keyword.

13. The non-transitory computer-readable storage medium of claim 10, wherein the types of relationships include a relevancy of the search result to the user.

14. The non-transitory computer-readable storage medium of claim 10, wherein the first category includes search results that identify people type objects, the query object identifies a person, and the types of relationships include at least one of: people included in email threads with the person, people with meetings in common with the person, people belonging to a same organization as the person, and people sharing a postal address with the person.

15. The non-transitory computer-readable storage medium of claim 10, wherein the first category includes search results that identify message type objects, the query object identifies a person, and the types of relationships include at least one of: messages sent by the person, messages received by the person, and messages mentioning the person.

16. The non-transitory computer-readable storage medium of claim 10, wherein the first category includes search results that identify organization type objects, the query object identifies a person, and the types of relationships include at least one of: organizations associated with the person, and organizations at which the person attended a meeting.

17. The non-transitory computer-readable storage medium of claim 10, wherein the first category includes search results that identify location type objects, the query object identifies a person, and the types of relationships include at least one of: locations associated with the person, and locations at which the person attended a meeting.

18. The non-transitory computer-readable storage medium of claim 10, wherein the first category includes search results that identify event type objects, the query object identifies a person, and the types of relationships include at least one of: events organized by the person, and events participated in by the person, and events at which the person attended a meeting.

19. A computer-implemented method of performing a relationship-based search, the method comprising:

receiving a user query from a user, the user query referencing a person type object;

processing the user query into a plurality of sub-queries for information related to the person type object, each sub-query being for a corresponding one of a plurality of information sources;

submitting the plurality of sub-queries to the plurality of information sources;

receiving search results for the plurality of sub-queries from the information sources, each search result identifying (a) a search result object related to the person type object and (b) a type of relationship indicating a type of relevancy of the search result to the search query;

organizing the search results into a plurality of categories based on types of objects identified in the search results, wherein each of the plurality of categories includes a respective type of objects, the plurality of categories including a first category comprising a first subset of search results of person object type and a second category comprising a second subset of search results of location object type;

organizing the first subset of search results in the first category into a plurality of buckets based on types of relationships indicating types of relevancy of the first subset of search results to the user query referencing the person type object, each bucket including search results with a respective type of relationship with the search query referencing the person type object, the plurality of buckets including a first bucket comprising a first further subset of the first subset of search results in the first category with a first type of relationship with the search query referencing the person type object and a second bucket comprising a second further subset of the first subset of search results in the first category with a second type of relationship with the search query referencing the person type object; and providing the search results organized into the plurality of categories, the provided search results including the first subset of search results in the first category organized into the plurality of buckets for presentation to the user.

20. The method of claim 19, wherein the processing comprises:

processing the user query into a sub-query for information related to the person for a social network model of the user, the social network model comprising information about a plurality of objects related to the user and relationships among the plurality of objects, wherein the submitting comprises:

submitting the sub-query to the social network model, and wherein the receiving comprises:

receiving from the social network model a search result identifying an object related to the person according to the relationships among the plurality of objects in the social network model.

21. The method of claim 19, wherein the processing comprises:

processing the user query into a sub-query for information related to the person for an indexing server, the sub-query including a text keyword corresponding to the person's name, and the indexing server indexing documents transmitted to or from the user, wherein the submitting comprises:

submitting the sub-query to the indexing server, and wherein the receiving comprises:

receiving from the indexing server a search result identifying a document including the text keyword corresponding to the person's name.

* * * * *